United States Patent
Kim et al.

(10) Patent No.: US 12,480,026 B2
(45) Date of Patent: Nov. 25, 2025

(54) ADHESIVE SHEET, ADHESIVE COMPOSITION THEREFOR, OPTICAL MEMBER COMPRISING SAME, AND OPTICAL DISPLAY DEVICE COMPRISING SAME

(71) Applicant: SAMSUNG SDI CO., LTD., Yongin-si (KR)

(72) Inventors: Do Young Kim, Suwon-si (KR); Il Jin Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 817 days.

(21) Appl. No.: 17/755,781

(22) PCT Filed: Nov. 12, 2020

(86) PCT No.: PCT/KR2020/015887
§ 371 (c)(1),
(2) Date: May 6, 2022

(87) PCT Pub. No.: WO2021/096247
PCT Pub. Date: May 20, 2021

(65) Prior Publication Data
US 2022/0389288 A1 Dec. 8, 2022

(30) Foreign Application Priority Data

Nov. 12, 2019 (KR) .......... 10-2019-0144622

(51) Int. Cl.
*C09J 133/04* (2006.01)
*C08K 5/00* (2006.01)
*C08K 5/09* (2006.01)
*C08K 5/103* (2006.01)
*C08K 5/132* (2006.01)
*C08K 5/29* (2006.01)
*C09J 7/22* (2018.01)
*C09J 133/06* (2006.01)
*C09J 133/08* (2006.01)

(52) U.S. Cl.
CPC ......... *C09J 133/066* (2013.01); *C08K 5/0075* (2013.01); *C08K 5/09* (2013.01); *C08K 5/103* (2013.01); *C08K 5/132* (2013.01); *C09J 7/22* (2018.01); *C09J 133/08* (2013.01); *C08K 5/0025* (2013.01); *C08K 5/29* (2013.01); *C09J 2203/318* (2013.01); *C09J 2301/312* (2020.08); *C09J 2301/416* (2020.08); *C09J 2433/00* (2013.01)

(58) Field of Classification Search
None
See application file for complete search history.

(56) References Cited

U.S. PATENT DOCUMENTS

| 2013/0034728 A1* | 2/2013 | Kataoka | ............. C09J 7/38 524/99 |
| 2021/0139754 A1* | 5/2021 | Ishii | ............. C09J 151/06 |

FOREIGN PATENT DOCUMENTS

| CN | 101864248 A | | 10/2010 | |
| CN | 103614090 A | * | 3/2014 | ........... C09J 183/04 |
| CN | 109666426 A | * | 4/2019 | |
| JP | 2011132297 A | * | 7/2011 | |
| JP | 2012107093 A | * | 6/2012 | ............... C09J 7/22 |
| JP | 2014-189716 A | | 10/2014 | |
| JP | 2015010192 A | * | 1/2015 | ......... C09J 133/066 |
| JP | 6153635 B1 | | 6/2017 | |
| JP | 6241699 B2 | * | 12/2017 | ............ C09J 11/06 |
| KR | 10-2007-0055363 A | | 5/2007 | |
| KR | 10-2011-0072119 A | | 6/2011 | |
| KR | 10-2017-0090354 A | | 8/2017 | |
| KR | 10-2017-0114061 A | | 10/2017 | |
| KR | 10-2018-0001984 A | | 1/2018 | |
| KR | 10-1955761 B1 | | 3/2019 | |
| KR | 10-2019-0087768 A | | 7/2019 | |
| TW | 201231608 A | | 8/2012 | |
| WO | WO-2014163003 A1 | * | 10/2014 | ......... C09J 133/066 |
| WO | WO-2018221109 A1 | * | 12/2018 | ............ C09J 133/06 |

OTHER PUBLICATIONS

Machine translation of WO 2018221109 A1 (Year: 2018).*
Machine translation of CN 109666426 A (Year: 2019).*
Machines translation of JP_2011132297_A (Year: 2011).*
Machine translation of CN103614090A (Year: 2014).*
Machine translation of WO-2014163003-A1 (Year: 2014).*
Machine translation of JP 2012107093 A (Year: 2012).*
Machine translation of JP 2015010192 A (Year: 2015).*
Machine translation of JP 6241699 B2 (Year: 2017).*
International Search Report of PCT/KR2020/015887, Feb. 19, 2021, 4 pages.
Chinese Office Action dated Jun. 15, 2023 issued in corresponding Chinese Patent Application No. 202080079643.3 (6 pages).

* cited by examiner

*Primary Examiner* — Frank D Ducheneaux
(74) *Attorney, Agent, or Firm* — Womble Bond Dickinson (US) LLP

(57) ABSTRACT

Provided are an adhesive sheet, an adhesive composition therefor, an optical member comprising same, and an optical display device comprising same, wherein the adhesive sheet comprises an adhesive layer formed of an adhesive composition containing a hydroxyl group-containing (meth)acrylic copolymer, a photo-initiator, a photo-curable crosslinking agent, and a heat-curable crosslinking agent; the heat-curable crosslinking agent contains an isocyanate-type crosslinking agent and carboxyl group-containing (meth)acrylate; the adhesive layer has a peeling strength of about 600 gf/in or more relative to a glass substrate at 25° C. and has a surface energy of about 70 mN/m or more at 25° C.

19 Claims, No Drawings

ADHESIVE SHEET, ADHESIVE COMPOSITION THEREFOR, OPTICAL MEMBER COMPRISING SAME, AND OPTICAL DISPLAY DEVICE COMPRISING SAME

CROSS-REFERENCE TO RELATED APPLICATIONS

This application is a U.S. National Phase Patent Application of International Application Number PCT/KR2020/015887, filed on Nov. 12, 2020, which claims priority of Korean Patent Application Number 10-2019-0144622, filed on Nov. 12, 2019, the entire content of each of which is incorporated herein by reference.

TECHNICAL FIELD

The present invention relates to an adhesive sheet, an adhesive composition therefor, an optical member including the same, and an optical display device including the same.

BACKGROUND ART

An optical display device includes display elements, such as organic light emitting devices and the like. A typical organic light emitting device includes a glass plate as a substrate. In recent years, however, there is increasing interest in wearable or foldable devices. In response to this interest, an attempt has been made to adopt a plastic film as a substrate of the organic light emitting diode instead of the glass plate.

Although a display panel corresponding to the outermost layer of the optical display device may be mounted per se on the optical display device, an adhesive sheet may be attached to the display panel to protect components in the optical display device from external impact. The adhesive sheet may be composed of a base film and an adhesive layer. To this end, the adhesive sheet is required to have good peel strength with respect to the display panel.

However, even when the adhesive sheet is disposed on the display panel, the adhesive sheet can also be damaged by external impact and is often removed from the display panel, as needed. Upon removal of the adhesive sheet from the display panel, residue of the adhesive layer or foreign matter can remain thereon, thereby providing unpleasant appearance and obstruction in attachment of a new adhesive sheet thereto.

The background technique of the present invention is disclosed in Korean Patent Laid-open Publication No. 10-2007-0055363 and the like.

DISCLOSURE

Technical Problem

It is one aspect of the present invention to provide an adhesive sheet that exhibits good peel strength with respect to an adherend while securing good reworkability with respect to the adherend.

It is another aspect of the present invention to provide an adhesive sheet that exhibits good residue characteristics upon removal of the adhesive sheet from an adherend after the adhesive sheet is attached thereto.

It is a further aspect of the present invention to provide an adhesive composition that can realize the adhesive sheet and exhibits good storage stability.

Technical Solution

1. In accordance with one aspect of the present invention, an adhesive sheet includes an adhesive layer formed of an adhesive composition comprising a hydroxyl group-containing (meth)acrylic copolymer, a photoinitiator, a photocurable crosslinking agent, and a thermosetting crosslinking agent, wherein the thermosetting crosslinking agent includes an isocyanate type crosslinking agent and a carboxyl group-containing (meth)acrylate, and the adhesive layer has a peel strength of about 600 gf/in or more with respect to a glass plate at 25° C. and a surface energy of about 70 mN/m or more at 25° C.

2. In 1, the adhesive sheet may have a surface energy variation rate of about 90% or less, as calculated by Equation 1.

$$\text{Surface energy variation rate} = |SE2-SE1|/SE1 \times 100, \quad [\text{Equation 1}]$$

where SE1 is a surface energy of a glass plate at 25° C. (unit: mN/m) and SE2 is a surface energy of the glass plate at 25° C. (unit: mN/m), as measured after the adhesive sheet bonded to the glass plate via the adhesive layer is left at 25° C. for 2 hours and removed from the glass plate.

3. In 1 and 2, the hydroxyl group-containing (meth)acrylic copolymer may include a non-carboxylic acid-based copolymer free from a carboxyl group.

4. In 1 to 3, the hydroxyl group-containing (meth)acrylic copolymer may include a copolymer of a monomer mixture including a hydroxyl group-containing (meth)acrylic monomer and an alkyl group-containing (meth)acrylic monomer.

5. In 4, the hydroxyl group-containing (meth)acrylic monomer may be present in an amount of about 5 wt % to about 20 wt % in the monomer mixture.

6. In 1 to 5, the photocurable crosslinking agent may include a bifunctional to hexafunctional (meth)acrylate.

7. In 1 to 6, the photocurable crosslinking agent may be present in an amount of about 0.1 parts by weight to about 20 parts by weight relative to 100 parts by weight of all of the hydroxyl group-containing (meth)acrylic copolymer and the photocurable crosslinking agent.

8. In 1 to 7, the isocyanate type crosslinking agent may include a polyhydric alcohol-modified isocyanate type crosslinking agent.

9. In 1 to 8, the carboxyl group-containing (meth)acrylate may include a carboxyl alkyl (meth)acrylate.

10. In 1 to 9, a weight ratio of the carboxyl group-containing (meth)acrylate to the isocyanate type crosslinking agent may range from about 1:1 to about 1:5.

11. In 1 to 10, the thermosetting crosslinking agent may be present in an amount of about 0.001 parts by weight to less than about 2 parts by weight relative to 100 parts by weight of all of the hydroxyl group-containing (meth)acrylic copolymer and the photocurable crosslinking agent.

12. In 1 to 11, the adhesive sheet may further include a base film on one surface of the adhesive layer and the base film may have a light transmittance of about 90% or more at a wavelength of 200 nm to 400 nm.

13. In 1 to 11, the adhesive layer may further include an antistatic agent. The antistatic agent may include metal nanowires.

14. In accordance with another aspect of the present invention, an adhesive composition includes: a hydroxyl group-containing (meth)acrylic copolymer, a photoinitiator, a photocurable crosslinking agent, and a thermosetting crosslinking agent, wherein the thermosetting crosslinking agent includes an isocyanate type crosslinking agent and a carboxyl group-containing (meth)acrylate, and is present in an amount of about 0.001 parts by weight to less than about 2 parts by weight relative to 100 parts by weight of all of the hydroxyl group-containing (meth)acrylic copolymer and the photocurable crosslinking agent.

15. In 14, the adhesive composition may include: about 80 parts by weight to about 99.9 parts by weight of the hydroxyl group-containing (meth)acrylic copolymer; about 0.1 parts by weight to about 20 parts by weight of the photocurable crosslinking agent; about 0.001 parts by weight to about 5 parts by weight of the photoinitiator relative to 100 parts by weight of all of the hydroxyl group-containing (meth)acrylic copolymer and the photocurable crosslinking agent, and about 0.001 parts by weight to less than about 2 parts by weight of the thermosetting crosslinking agent relative to 100 parts by weight of all of the hydroxyl group-containing (meth)acrylic copolymer and the photocurable crosslinking agent.

16. In 14, a weight ratio of the carboxyl group-containing (meth)acrylate to the isocyanate type crosslinking agent may range from about 1:1 to about 1:5.

17. In 14, the adhesive composition may have a viscosity variation rate of about 15% or less, as calculated by Equation 2.

$$\text{Viscosity variation rate}=|V2-V1|/V1\times100,\qquad\text{[Equation 2]}$$

where V1 is a viscosity (unit: cP) of 1 g of the adhesive composition at 25° C. and V2 is a viscosity (unit: cP) of 1 g of the adhesive composition after the adhesive composition is left at 25° C. for 3 days.

In accordance with a further aspect of the present invention, an optical member includes an adherend for optical displays and the adhesive sheet according to the present invention formed on at least one surface of the adherend.

In accordance with yet another aspect of the present invention, an optical display device includes the adhesive sheet according to the present invention.

Advantageous Effects

The present invention provides an adhesive sheet that exhibits good peel strength with respect to an adherend while securing good reworkability with respect to the adherend.

The present invention provides an adhesive sheet that exhibits good residue characteristics upon removal of the adhesive sheet from an adherend after the adhesive sheet is attached thereto.

The present invention provides an adhesive composition that can realize the adhesive sheet and exhibits good storage stability.

BEST MODE

Hereinafter, embodiments of the present invention will be described in detail. It should be understood that the present invention may be realized in various ways and is not limited to the following embodiments.

Herein, "(meth)acryl" may mean acryl and/or methacryl. In addition, "copolymer" may include an oligomer, a polymer or a resin.

With effort to develop an adhesive sheet that includes a base film and an adhesive layer, exhibits good adhesion or attachment between the base film and the adhesive layer, good peel strength and reworkability with respect to an adherend, and good residue characteristics with respect to the adherend upon removal of the adhesive sheet from the adherend after the adhesive sheet is attached thereto, the inventors developed an adhesive composition for the adhesive layer, thereby achieving the present invention.

Herein, "adherend" may mean not only a glass plate but also a plastic film formed of a polyimide resin, an acryl resin, and the like.

In one embodiment, the adherend may be a glass plate, preferably an alkali-free glass plate. Preferably, the glass plate includes a functional coating layer, for example, an anti-fingerprint layer, an antireflective layer, an antiglare layer, and the like, on a surface thereof to which the adhesive layer is attached.

Hereinafter, an adhesive sheet according to one embodiment of the present invention will be described.

According to the present invention, the adhesive sheet may be attached to an adherend of a display panel corresponding to the outermost layer of an optical display device to protect the adherend and may be removed therefrom when an adhesive layer is damaged or there is a need for removal of the adhesive layer. To this end, the adhesive layer is required to have not only good peel strength with respect to the adherend but also reworkability with respect thereto and to have good residue characteristics in order to prevent foreign matter or residue of the adhesive from remaining upon removal of the adhesive layer from the adherend.

The adhesive sheet includes an adhesive layer, which has a peel strength of about 600 gf/in or more with respect to a glass plate at 25° C. With this peel strength, the adhesive sheet can be adhesively attached to the glass plate without being separated from an adherend upon attachment of the adhesive sheet to the adherend. Preferably, the adhesive layer has a peel strength of about 600 gf/in to about 1,000 gf/in with respect to a glass plate at 25° C., more preferably about 600 gf/in to about 950 gf/in. Herein "peel strength" may be measured by a peel strength evaluation method described below.

The adhesive layer has a surface energy of about 70 mN/m or more at 25° C. With this surface energy, the adhesive layer can be removed from an adherend without foreign matter or residue remaining on the adherend, whereby another adhesive layer can be effectively attached to the adherend. Preferably, the adhesive layer has a surface energy at 25° C. of about 70 mN/m to about 80 mN/m or about 70 mN/m to about 75 mN/m. Here, "surface energy" may be measured with reference to evaluation of surface energy described below. For example, the adhesive layer may have a surface energy at 25° C. of about 70 mN/m, 71 mN/m, 72 mN/m, 73 mN/m, 74 mN/m, 75 mN/m, 76 mN/m, 77 mN/m, 78 mN/m, 79 mN/m, or 80 mN/m.

The adhesive layer has a water contact angle of about 30° or more at 25° C. With this water contact angle, the adhesive layer can be removed from an adherend without foreign matter or residue remaining on the adherend, whereby another adhesive layer can be effectively attached to the adherend. Preferably, the adhesive layer has a water contact angle of greater than about 30° to about 60° at 25° C., more preferably about 34° to about 60°. Here, "water contact angle" may be measured with reference to evaluation of water contact angle described below. For example, the adhesive layer has a water contact angle at 25° C. of about 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, or 60°.

To realize the adhesive layer, the adhesive layer may be formed of an adhesive composition including a hydroxyl group-containing (meth)acrylic copolymer, a photoinitiator, a photocurable crosslinking agent, and a thermosetting crosslinking agent. Hereinafter, each of the components of the adhesive composition will be described in more detail.

The hydroxyl group-containing (meth)acrylic copolymer forms a matrix of the adhesive layer, in which the hydroxyl group reacts with the thermosetting crosslinking agent to secure peel strength within a predetermined range. In addition, when a base film is further formed on the adhesive layer to support the adhesive layer or to form the adhesive layer, adhesion or attachment between the base film and the adhesive layer can be improved.

In one embodiment, the hydroxyl group-containing (meth)acrylic copolymer may be a silicone-free copolymer.

In one embodiment, the hydroxyl group-containing (meth)acrylic copolymer may be a non-carboxylic acid-based copolymer free from a carboxyl group. When the hydroxyl group-containing (meth)acrylic copolymer contains a carboxyl group therein, the adhesive composition cannot provide the advantageous effects of the present invention and suffers from increase in viscosity variation rate, thereby causing deterioration in processability.

The hydroxyl group-containing (meth)acrylic copolymer may be a copolymer of a monomer mixture including a hydroxyl group-containing (meth)acrylic monomer and an alkyl group-containing (meth)acrylic monomer. The monomer mixture may further include a co-monomer.

The hydroxyl group-containing (meth)acrylic monomer can impart peel strength to the adhesive layer. The hydroxyl group-containing (meth)acrylic monomer may include a (meth)acrylate containing at least one hydroxyl group. For example, the hydroxyl group-containing (meth)acrylate may include at least one selected from among 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono(meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, trimethylolethane di(meth) acrylate, 2-hydroxy-3-penyloxypropyl (meth)acrylate, 4-hydroxycyclopentyl (meth)acrylate, 4-hydroxycyclohexyl (meth)acrylate, and cyclohexanedimethanol mono(meth) acrylate. Preferably, the hydroxyl group-containing (meth) acrylate may include at least one selected from among 4-hydroxybutyl (meth)acrylate, 2-hydroxyethyl(meth)acrylate, 6-hydroxyhexyl(meth)acrylate, and 4-hydroxypropyl (meth)acrylate.

The hydroxyl group-containing (meth)acrylic monomer may be present in an amount of about 5 wt % to about 20 wt %, preferably about 5 wt % to about 15 wt %, in the monomer mixture. Within this range, the adhesive composition can improve peel strength with respect to an adherend. For example, the hydroxyl group-containing (meth)acrylic monomer may be present in an amount of about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %, in the monomer mixture.

The alkyl group-containing (meth)acrylic monomer may form a matrix of the adhesive layer. The alkyl group-containing (meth)acrylic monomer may include a unsubstituted $C_1$ to $C_{20}$ linear or branched alkyl group-containing (meth)acrylate. For example, the alkyl group-containing (meth)acrylate may include at least one selected from among methyl (meth)acrylate, ethyl (meth)acrylate, propyl (meth) acrylate, n-butyl (meth)acrylate, t-butyl (meth)acrylate, iso-butyl (meth)acrylate, pentyl (meth)acrylate, hexyl (meth) acrylate, heptyl (meth)acrylate, ethylhexyl (meth)acrylate, octyl (meth)acrylate, iso-octyl (meth)acrylate, nonyl (meth) acrylate, decyl (meth)acrylate, lauryl (meth)acrylate, isobornyl (meth)acrylate, and ethylhexyl diglycol (meth)acrylate.

In the monomer mixture, the alkyl group-containing (meth)acrylic monomer may be present in an amount of about 80 wt % to about 95 wt %, preferably about 85 wt % to about 95 wt %. Within this range, the alkyl group-containing (meth)acrylic monomer can secure formation of the adhesive layer. For example, the alkyl group-containing (meth)acrylic monomer may be present in an amount of about 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, or 95 wt %, in the monomer mixture.

The hydroxyl group-containing (meth)acrylic copolymer may be a copolymer of a binary monomer mixture consisting of the hydroxyl group-containing (meth)acrylic monomer and the alkyl group-containing (meth)acrylic monomer, or a copolymer of the monomer mixture further including a comonomer.

The comonomer may include a monomer copolymerizable with the hydroxyl group-containing (meth)acrylic monomer and/or the alkyl group-containing (meth)acrylic monomer. The comonomer may include at least one selected from among an aromatic group-containing monomer, an alicyclic group-containing monomer, and a hetero alicyclic group-containing monomer, without being limited thereto. Each of the aromatic group-containing monomer, the alicyclic group-containing monomer, and the hetero alicyclic group-containing monomer may include a typical monomer known to those skilled in the art. The comonomer may be optionally present in an amount of about 10 wt % or less, preferably about 5 wt % or less, in the monomer mixture. For example, the comonomer may be present in an amount of about 0 wt %, 1 wt %, 2 wt %, 3 wt %, 4 wt %, 5 wt %, 6 wt %, 7 wt %, 8 wt %, 9 wt %, or 10 wt % in the monomer mixture.

The hydroxyl group-containing (meth)acrylic monomer may have a weight average molecular weight of about 2,000,000 to about 4,000,000, preferably about 2,000,000 to about 3,000,000. Within this range, the adhesive composition can easily realize the effects of the present invention.

The hydroxyl group-containing (meth)acrylic monomer may be prepared from the monomer mixture through a typical polymerization method well-known to those skilled in the art. The polymerization method is a typical method well-known to those skilled in the art.

The hydroxyl group-containing (meth)acrylic copolymer may be present in an amount of about 80 parts by weight to about 99.9 parts by weight, preferably about 85 parts by weight to about 99.5 parts by weight, more preferably about 90 parts by weight to about 99.5 parts by weight, relative to 100 parts by weight of all of the hydroxyl group-containing (meth)acrylic copolymer and the photocurable crosslinking agent. Within this range, the adhesive composition can secure peel strength and durability. For example, the hydroxyl group-containing (meth)acrylic copolymer may be present in an amount of about 80, 81, 82, 83, 84, 85, 86, 87, 88, 89, 90, 91, 92, 93, 94, 95, 96, 97, 98, 99 or 99.9 parts by weight relative to 100 parts by weight of all of the hydroxyl group-containing (meth)acrylic copolymer and the photocurable crosslinking agent.

The photoinitiator can promote curing reaction between a cured product of the hydroxyl group-containing (meth) acrylic copolymer and the thermosetting crosslinking agent and the photocurable crosslinking agent. The photoinitiator may include a typical photo-radical initiator. For example, the photoinitiator may include benzoin, hydroxy ketone, amino ketone or phosphine oxide photoinitiators, without being limited thereto.

The photoinitiator may be present in an amount of about 0.001 parts by weight to about 5 parts by weight relative to 100 parts by weight of all of the hydroxyl group-containing (meth)acrylic copolymer and the photocurable crosslinking agent. Within this range, the photoinitiator can secure sufficient photocuring reaction and can prevent deterioration in transparency of the adhesive layer due to residual photoinitiator. Preferably, the photoinitiator is present in an amount of about 0.01 parts by weight to about 5 parts by weight, about 0.01 parts by weight to about 1 part by weight. For example, the photoinitiator may be present in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4 or 5 parts by weight relative to 100 parts by weight of all of the hydroxyl group-containing (meth)acrylic copolymer and the photocurable crosslinking agent.

The photocurable crosslinking agent can increase the curing rate of the adhesive layer through reaction with a cured product of the hydroxyl group-containing (meth)acrylic copolymer and the thermosetting crosslinking agent while securing peel strength within the above range.

In one embodiment, the photocurable crosslinking agent may be a carboxyl group-free photocurable crosslinking agent.

In one embodiment, the photocurable crosslinking agent may include a bifunctional to hexafunctional (meth)acrylate. For example, the photocurable crosslinking agent may include bifunctional acrylates, such as unsubstituted $C_1$ to $C_{10}$ alkylene group-containing di(meth)acrylates including 1,4-butanediol di(meth)acrylate, 1,6-hexanediol di(meth)acrylate, and the like, di(meth)acrylates with $C_1$ to $C_{10}$ alkylene groups with $C_1$ to $C_3$ oxyalkylene groups including dipropylene glycol di(meth)acrylate, polyethylene glycol di(meth)acrylate, and the like, neopentyl glycol di(meth)acrylate, neopentyl glycol adipate di(meth)acrylate, dicyclopentanyl di(meth)acrylate, caprolactone-modified dicyclopentenyl di(meth)acrylate, ethylene oxide-modified di(meth)acrylate, di(meth)acryl oxy ethyl isocyanurate, allylated cyclohexyl di(meth)acrylate, tricyclodecane dimethanol (meth)acrylate, dimethylol dicyclopentane (meth)acrylate, ethylene oxide-modified hexahydrophthalic acid di(meth)acrylate, tricyclodecane dimethanol(meth)acrylate, neopentyl glycol-modified trimethylpropane di(meth)acrylate, adamantane di(meth)acrylate, and 9,9-bis[4-(2-acryloyloxyethoxy)phenyl]fluorene; trifunctional acrylates, such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, trifunctional urethane (meth)acrylates, and tris(meth)acryloxyethyl isocyanurate; tetrafunctional acrylates, such as diglycerin tetra(meth)acrylate and pentaerythritol tetra(meth)acrylate; pentafunctional acrylates, such as dipentaerythritol penta(meth)acrylate; and hexafunctional (meth)acrylates, such as dipentaerythritol hexa(meth)acrylate, caprolactone-modified dipentaerythritol hexa(meth)acrylate, and urethane (meth)acrylates (e.g., reaction products of an isocyanate monomer and trimethylolpropane tri(meth)acrylate), without being limited thereto. These may be used alone or as a mixture thereof.

Preferably, the photocurable crosslinking agent includes hexafunctional (meth)acrylates, such as dipentaerythritol hexa(meth)acrylate, caprolactone-modified dipentaerythritol hexa(meth)acrylate, and urethane (meth)acrylates (e.g., reaction products of an isocyanate monomer and trimethylolpropane tri(meth)acrylate), without being limited thereto. These may be used alone or as a mixture thereof.

The photocurable crosslinking agent may be present in an amount of about 0.1 parts by weight to about 20 parts by weight, preferably about 0.5 parts by weight to about 15 parts by weight, more preferably about 0.5 parts by weight to about 10 parts by weight, relative to 100 parts by weight of all of the hydroxyl group-containing (meth)acrylic copolymer and the photocurable crosslinking agent. Within this range, the adhesive composition can provide an adhesive film that can reach peel strength within the above range through adjustment of peel strength and can exhibit good stability over time. For example, the photocurable crosslinking agent may be present in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19 or 20 parts by weight relative to 100 parts by weight of all of the hydroxyl group-containing (meth)acrylic copolymer and the photocurable crosslinking agent.

According to the present invention, the adhesive composition includes the thermosetting crosslinking agent together with the photocurable crosslinking agent, thereby enabling formation of an adhesive layer through dual curing including photo curing and heat curing. The adhesive composition free from the thermosetting crosslinking agent has a low surface energy variation rate of Equation 1 and allows much foreign matter or residue of the adhesive layer to remain on an adherend upon removal of the adhesive layer from the adherend, thereby making it difficult for the adherend to be reused.

The thermosetting crosslinking agent include both an isocyanate type crosslinking agent and a carboxyl group-containing (meth)acrylate.

Instead of using the hydroxyl group-containing (meth)acrylic copolymer containing the carboxyl group-containing monomer therein, the adhesive composition may include both the hydroxyl group-containing (meth)acrylic copolymer and the carboxyl group-containing (meth)acrylate together with the isocyanate type crosslinking agent and the photocurable crosslinking agent. As a result, the adhesive composition can provide an adhesive film that can secure peel strength with respect to an adherend within a predetermined range while preventing foreign matter or residue of the adhesive film from remaining on the adherend upon removal of the adhesive film from the adherend. When the carboxyl group-containing (meth)acrylate is included as a monomer for polymerization of the hydroxyl group-containing (meth)acrylic copolymer, the adhesive composition has low storage stability to make it difficult to form an adhesive layer, does not simultaneously satisfy peel strength and water contact angle within the above ranges, and has a high surface energy variation rate of Equation 1 to make it difficult to reuse the adherend. A higher surface energy variation rate indicates a larger amount of foreign matter or residue derived from the adhesive layer and remaining on the adherend upon removal of the adhesive layer from the adherend after the adhesive layer is attached thereto.

The adhesive sheet may have a surface energy variation rate of about 90% or less, specifically about 0% to about 90%, more specifically about 80% to about 90%, as calculated by Equation 1. Within this range, the adhesive layer allows reuse of an adherend even after removal of the adhesive layer therefrom.

Surface energy variation rate=|SE2−SE1|/SE1×100, [Equation 1]

where SE1 is a surface energy of a glass plate at 25° C. (unit: mN/m) and SE2 is a surface energy of the glass plate at 25° C. (unit: mN/m), as measured after the adhesive sheet bonded to the glass plate via the adhesive layer is left at 25° C. for 2 hours and removed from the glass plate.

The isocyanate type crosslinking agent forms a matrix of the adhesive layer by heat curing of the adhesive composition through crosslinking reaction with the hydroxyl group-containing (meth)acrylic copolymer and can secure some of peel strength of the present invention.

The isocyanate type crosslinking agent may include a typical isocyanate type crosslinking agent having at least two, for example, two to six isocyanate groups. For example, the isocyanate type crosslinking agent may include at least one selected from among xylene diisocyanates (XDI) including m-xylene diisocyanate and the like, methylene bis(phenyl isocyanate) (MDI) including 4,4'-methylene bis (phenyl isocyanate) and the like, naphthalene diisocyanate, toluene diisocyanate, hexamethylene diisocyanate, isophorone diisocyanate, and adducts thereof.

In one embodiment, the isocyanate type crosslinking agent may include a polyhydric alcohol-modified isocyanate type crosslinking agent. The polyhydric alcohol blocks some isocyanate groups of the isocyanate type crosslinking agent to allow easy achievement of the effects of the present invention. The polyhydric alcohol may include trimethylolpropane, without being limited thereto.

Preferably, the isocyanate type crosslinking agent includes a trifunctional crosslinking agent.

The isocyanate type crosslinking agent may be present in an amount of about 0.01 parts by weight to about 5 parts by weight relative to 100 parts by weight of all of the hydroxyl group-containing (meth)acrylic copolymer and the photocurable crosslinking agent. Within this range, the isocyanate type crosslinking agent can improve adhesion and the curing degree of the adhesive composition. Preferably, the isocyanate type crosslinking agent is present in an amount of about 0.01 parts by weight to about 3 parts by weight or about 0.05 parts by weight to about 1 part by weight. For example, the isocyanate type crosslinking agent is present in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4 or 5 parts by weight relative to 100 parts by weight of all of the hydroxyl group-containing (meth)acrylic copolymer and the photocurable crosslinking agent.

The carboxyl group-containing (meth)acrylate can improve both adhesion and attachment between a coating layer and a base film even when the coating layer has a great thickness upon coating of the adhesive composition onto the base film to form an adhesive layer. The carboxyl group-containing (meth)acrylate may include carboxyl alkyl (meth)acrylate including β-carboxyl ethyl (meth)acrylate and the like. Here, the alkyl may be a $C_1$ to $C_5$.

The carboxyl group-containing (meth)acrylate may be present in an amount of about 0.001 parts by weight to about 5 parts by weight relative to 100 parts by weight of all of the hydroxyl group-containing (meth)acrylic copolymer and the photocurable crosslinking agent. Within this range, the carboxyl group-containing (meth)acrylate can improve durability and residual adhesive strength of the adhesive sheet. Preferably, the carboxyl group-containing (meth)acrylate may be present in an amount of about 0.01 parts by weight to about 3 parts by weight, or about 0.01 parts by weight to about 1 part by weight. For example, the carboxyl group-containing (meth)acrylate may be present in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4 or 5 parts by weight relative to 100 parts by weight of all of the hydroxyl group-containing (meth)acrylic copolymer and the photocurable crosslinking agent.

The thermosetting crosslinking agent, that is, all of the isocyanate type crosslinking agent and the carboxyl group-containing (meth)acrylate, may be present in an amount of about 0.001 parts by weight to less than about 2 parts by weight relative to 100 parts by weight of all of the hydroxyl group-containing (meth)acrylic copolymer and the photocurable crosslinking agent. Within this range, the thermosetting crosslinking agent can improve adhesion of the adhesive layer and residue characteristics. Preferably, the thermosetting crosslinking agent is present in an amount of about 0.01 parts by weight to about 1.5 parts by weight, or about 0.1 parts by weight to about 1.5 parts by weight. For example, the thermosetting crosslinking agent, that is, all of the isocyanate type crosslinking agent and the carboxyl group-containing (meth)acrylate, may be present in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9 or 1.999 parts by weight relative to 100 parts by weight of all of the hydroxyl group-containing (meth)acrylic copolymer and the photocurable crosslinking agent.

In the thermosetting crosslinking agent, the weight ratio of the carboxyl group-containing (meth)acrylate to the isocyanate type crosslinking agent may range from about 1:1 to about 1:5, preferably about 1:2 to about 1:3. Within this range, the thermosetting crosslinking agent can achieve optimization of curing reaction.

The adhesive composition may further include a silane coupling agent. The silane coupling agent can improve peel strength with respect to an adherend. The silane coupling agent may include a typical silane coupling agent known to those skilled in the art. The silane coupling agent may be present in an amount of about 0.001 parts by weight to about 1 part by weight, specifically about 0.003 parts by weight to about 1 part by weight, more specifically about 0.005 parts by weight to about 1 part by weight, relative to 100 parts by weight of all of the hydroxyl group-containing (meth)acrylic copolymer and the photocurable crosslinking agent. For example, the silane coupling agent may be present in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1 part by weight relative to 100 parts by weight of all of the hydroxyl group-containing (meth)acrylic copolymer and the photocurable crosslinking agent.

The adhesive composition may further include typical additives, such as an antistatic agent, a surfactant, a curing accelerator, an ionic liquid, a lithium salt, inorganic fillers, a softener, a molecular weight regulator, an antioxidant, an anti-aging agent, a stabilizer, a tackifier resin, a modified resin (a polyol resin, a phenol resin, an acryl resin, a polyester resin, a polyolefin resin, an epoxy resin, an epoxidized polybutadiene resin, and the like), a leveling agent, a defoaming agent, a plasticizer, dyes, pigments (a coloring pigment, an extender pigment, and the like), a treatment agent, a UV blocking agent, a fluorescent bleaching agent, a dispersant, a heat stabilizer, a light stabilizer, a UV absorber, a coagulant, a lubricant, a solvent, and the like. The antistatic agent may include metal nanowires, without being limited thereto. The additives may be present in an amount of about 0.001 parts by weight to about 1 part by weight, specifically 0.003 parts by weight to 1 part by weight, more specifically 0.005 parts by weight to 1 part by weight, relative to 100 parts by weight of all of the hydroxyl group-containing (meth)acrylic copolymer and the photocurable crosslinking agent. Within this range, the additives can secure advantageous effects thereof without affecting peel strength and reliability of an adhesive protective film. For example, the additives may be present in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1 part by weight relative to 100 parts by weight of all of the hydroxyl group-containing (meth)acrylic copolymer and the photocurable crosslinking agent.

The adhesive composition may further include a solvent. The solvent can improve coatability of the adhesive composition. The solvent may be a typical solvent, such as methyl ethyl ketone and the like, which is well-known to those skilled in the art. The solvent may be present in a balance amount excluding a solid content in the adhesive composition.

The adhesive composition has good storage stability as described above. In one embodiment, the adhesive composition may have a viscosity variation rate of about 15% or less, specifically about 0% to about 15%, as calculated by Equation 2. Within this range, the adhesive composition can exhibit good storage stability and processability.

$$\text{Viscosity variation rate} = |V2 - V1|/V1 \times 100, \quad \text{[Equation 2]}$$

where V1 is a viscosity (unit: cP) of 1 g of the adhesive composition at 25° C. and V2 is a viscosity (unit: cP) of 1 g of the adhesive composition after the adhesive composition is left at 25° C. for 3 days.

The adhesive layer may have a light transmittance of about 90% or more, specifically about 95% or more, at the visible spectrum (e.g., at a wavelength of 380 nm to 780 nm). Within this range, the adhesive layer has good optical transparency to be used in an optical display device.

The adhesive layer may have a thickness of about 10 μm to about 100 μm, preferably about 50 μm to about 80 μm.

For the adhesive sheet, the base film may be a typical resin film capable of supporting the adhesive layer without limitation. In one embodiment, the base film may have a light transmittance of about 90% or more, specifically about 95% or more, to facilitate photocuring while allowing transmission of light through the base film to secure a smooth surface of the adhesive layer even upon photocuring. Here, "light" may include UV light having a wavelength of 200 nm to 400 nm, without being limited thereto. Within this range, it is possible to secure good adhesion between the base film and the adhesive layer upon irradiation with light at the base film side in formation of the adhesive sheet.

In one embodiment, the base film may include a polyester film, such as polyethylene terephthalate, without being limited thereto. The base film may have a thickness of about 10 μm to about 100 μm, preferably about 50 μm to about 80 μm.

The adhesive sheet may be formed by coating the adhesive composition to a predetermined thickness on one or both surfaces of the base film, followed by heat curing and photocuring. Specifically, heat curing may be performed by heat treatment at about 50° C. to about 100° C. for about 0.1 min to about 60 min. Specifically, photocuring may be performed by irradiation with light having a wavelength of 200 nm to 400 nm at an intensity of about 1,000 mJ or more, specifically about 1,000 mJ to about 2,000 mJ.

Next, an optical member according to one embodiment of the present invention will be described.

The optical member according to the embodiment includes an adherend for optical display devices and an adhesive sheet formed on at least one surface of the adherend, wherein the adhesive sheet includes the adhesive sheet according to the embodiments of the present invention.

The adherend for optical display devices may include not only the aforementioned adherend, but also an optical film and the like. In one embodiment, the optical film may include a window film and a protective film for window films, without being limited thereto.

In one embodiment, the optical member may include an adherend; and the adhesive layer and the base film according to the present invention sequentially formed on the adherend.

Next, an optical display device according to one embodiment of the present invention will be described.

The optical display device according to the embodiment includes the adhesive sheet or the optical member according to the present invention. The optical display device may include a light emitting diode display, such as an organic light emitting diode display and the like, and a liquid crystal display, without being limited thereto. The optical display device may include a flexible device or a non-flexible device, without being limited thereto.

MODE FOR INVENTION

Next, the present invention will be described in more detail with reference to some examples. It should be understood that these examples are provided for illustration only and are not to be construed in any way as limiting the invention.

Example 1

A hydroxyl group-containing (meth)acrylic copolymer A (weight average molecular weight: 2,500,000) was prepared through polymerization of a monomer mixture prepared by mixing 85 parts by weight of 2-ethylhexyl acrylate and 15 parts by weight of 4-hydroxybutyl acrylate.

In terms of solid content, 99.5 parts by weight of the prepared hydroxyl group-containing (meth)acrylic copolymer A, 0.5 parts by weight of dipentaerythritol hexa-acrylate (DPHA, ENTIS) as a photocurable crosslinking agent, 0.03 parts by weight of a photoinitiator (Irgacure 184, BASF), 0.025 parts by weight of β-carboxyethyl acrylate CEA, ENTIS) as a thermosetting crosslinking agent, and 0.075 parts by weight of an isocyanate crosslinking agent L-45 (trifunctional isocyanate crosslinking agent, SOKEN) were mixed to prepare an adhesive composition.

Methyl ethyl ketone was added to the prepared adhesive composition to have a solid content of 90%, degassed, and left at room temperature for 3 days.

The adhesive composition was coated to a thickness of 20 μm on one surface of a polyethylene terephthalate (PET) base film (thickness: 75 μm, SKC Co., Ltd.) and was dried for heat curing at 80° C. for 2 minutes. Next, a polyethylene terephthalate (PET) release film (thickness: 25 μm, Dorey Advanced Material Co., Ltd.) was stacked on the coating layer and irradiated at a dose of 1,000 mJ/cm² under a metal halide lamp while purging with nitrogen to form an adhesive layer (thickness: 20 μm), thereby preparing an adhesive sheet comprising the base film and the adhesive layer.

Examples 2 and 3

Adhesive sheets each comprising a base film and an adhesive layer were prepared in the same manner as in Example 1 except that the components of the adhesive composition were changed as listed in Table 1 (unit: parts by weight).

Comparative Example 1

An adhesive sheet was prepared in the same manner as in Example 1 except that the thermosetting crosslinking agent was not used in preparation of the adhesive composition.

Comparative Example 2

An adhesive sheet was prepared in the same manner as in Example 1 except that the content of the thermosetting crosslinking agent was changed as in Table 1.

Comparative Example 3

A hydroxyl group-containing (meth)acrylic copolymer B (weight average molecular weight: 2,500,000) was prepared through polymerization of a monomer mixture prepared by mixing 85 parts by weight of 2-ethylhexyl acrylate, 15 parts by weight of 4-hydroxybutyl acrylate, and 0.1 parts by weight of β-carboxyethyl acrylate (β CEA, ENTIS).

In terms of solid content, 99.5 parts by weight of the prepared hydroxyl group-containing (meth)acrylic copolymer B, 0.5 parts by weight of dipentaerythritol hexa-acrylate (DPHA, ENTIS) as a photocurable crosslinking agent, 0.03 parts by weight of a photoinitiator (Irgacure 184, BASF), and 0.075 parts by weight of an isocyanate crosslinking agent L-45 (trifunctional isocyanate crosslinking agent, SOKEN) as a thermosetting crosslinking agent were mixed to prepare an adhesive composition.

Methyl ethyl ketone was added to the prepared adhesive composition to have a solid content of 90%, followed by degassing. Next, the adhesive composition was coated to a thickness of 25 μm on one surface of a polyethylene terephthalate (PET) base film (thickness: 75 μm, SKC Co., Ltd.) and was dried for heat curing at 80° C. for 2 minutes. Next, a polyethylene terephthalate (PET) release film (thickness: 20 μm, Dorey Advanced Material Co., Ltd.) was stacked on the coating layer and irradiated at a dose of 1,000 mJ/cm² under a metal halide lamp while purging with nitrogen to form an adhesive layer (thickness: 20 μm), thereby preparing an adhesive sheet comprising the base film and the adhesive layer.

The adhesive sheets prepared in Examples and Comparative Examples were evaluated as to the following properties of Table 2 and evaluation results are shown in Table 2.

(1) Peel strength (unit: gf/in): The adhesive sheet of the base film/adhesive layer prepared in each of Examples and Comparative Examples was cut into a rectangular piece having a size of 2.5 cm×10 cm (width×length), which in turn was attached to an alkali-free glass plate to form a stack of the adhesive layer and the base film on the glass plate, thereby preparing a specimen. The specimen was attached to a TA (Texture Analyzer) Instrument, followed by measuring peel strength upon removal of the piece of the specimen from the alkali-free glass plate to an angle 180° at 25° C. and at a peeling rate of 300 mm/min.

(2) Contact angle (unit: °) and surface energy (unit: mN/m): Water contact angle was measured at 25° C. with respect to the adhesive layer of the adhesive sheet prepared in each of Examples and Comparative Examples using an SEO contact angle meter. Surface energy was calculated based on the water contact angle using the Girifalco-Good-Fowkes-Young method (GGFY method).

(3) Haze (unit: %): Haze was measured on the adhesive layer of the adhesive sheet prepared in each of Examples and Comparative Examples using NDH-9000.

(4) Yellowness index (YI): Yellowness index was measured on the adhesive layer of the adhesive sheet prepared in each of Examples and Comparative Examples using a Konica Minolta CM-3600.

(5) Peel strength variation rate (unit: %): Peel strength variation rate was calculated based on the peel strength measured in (1). The peel strength variation rate was calculated by Equation: (Peel strength of Example or Comparative Example)/(Peel strength of Comparative Example 1)×100.

(6) Surface energy variation rate (unit: %): Water contact angle and surface energy were measured at 25° C. with respect to the alkali-free glass plate by the same method as in (2). With respect to the alkali-free glass plate, the adhesive layer has a water contact angle of 22.7° and a surface energy of 83.1 mN/m (SE1) at 25° C.

The adhesive sheet prepared in each of Examples and Comparative Examples was cut into a rectangular piece having a size of 2.5 cm×10 cm (width×length), which in turn was attached to an alkali-free glass plate via the adhesive layer. The piece was left in this state at 25° C. for 2 hours, followed by removal of the piece from the alkali-free glass plate.

Then, on a portion of the alkali-free glass plate from which the piece was removed, water contact angle and surface energy (SE2) were measured by the same method as

TABLE 1

| | Copolymer A | Copolymer A | Photocurable crosslinking agent DPHA | Photoinitiator Irgacure 184 | Thermosetting crosslinking agent | | Total amount |
|---|---|---|---|---|---|---|---|
| | | | | | β CEA | L-45 | |
| Example 1 | 99.5 | 0 | 0.5 | 0.03 | 0.025 | 0.075 | 0.1 |
| Example 2 | 99.5 | 0 | 0.5 | 0.03 | 0.125 | 0.375 | 0.5 |
| Example 3 | 99.5 | 0 | 0.5 | 0.03 | 0.25 | 0.75 | 1 |
| Comparative Example 1 | 99.5 | 0 | 0.5 | 0.03 | 0 | 0 | 0 |
| Comparative Example 2 | 99.5 | 0 | 0.5 | 0.03 | 0.5 | 1.5 | 2 |
| Comparative Example 3 | 0 | 99.5 | 0.5 | 0.03 | 0 | 0.075 | 0.075 | mentioned above. Surface energy variation rate was calculated based on the surface energy according to Equation 1.

$$\text{Surface energy variation rate} = |SE2 - SE1|/SE1 \times 100, \quad [\text{Equation 1}]$$

where

SE1 is a surface energy of a glass plate at 25° C. (unit: mN/m); and

SE2 is a surface energy of the glass plate at 25° C. (unit: mN/m), as measured after the adhesive sheet bonded to the glass plate via the adhesive layer is left at 25° C. for 2 hours and removed from the glass plate.

(7) Viscosity variation rate (unit: %): Viscosity (V1) at 25° C. was measured on 1 g of the adhesive composition prepared in each of Examples and Comparative Examples using a viscometer DV (Brookfield). The adhesive composition was left at 25° C. for 3 days, followed by measurement of viscosity (V2) at 25° C. by the same method. Viscosity variation rate was calculated by Equation 2.

$$\text{Viscosity variation rate} = |V2 - V1|/V1 \times 100, \quad [\text{Equation 2}]$$

where

V1 is a viscosity (unit: cP) of 1 g of the adhesive composition at 25° C.; and

V2 is a viscosity (unit: cP) of 1 g of the adhesive composition after the adhesive composition is left at 25° C. for 3 days.

TABLE 2

|  | Peel strength | Contact angle | Surface energy | Haze | YI | Peel strength variation rate | Surface energy variation rate | Viscosity variation rate |
|---|---|---|---|---|---|---|---|---|
| Example 1 | 678 | 41.1 | 70.2 | 0.32 | 0.3 | 97 | 85 | 3 |
| Example 2 | 652 | 37.2 | 72.5 | 0.34 | 0.3 | 94 | 87 | 7 |
| Example 3 | 642 | 34.3 | 74.9 | 0.31 | 0.32 | 92 | 90 | 12 |
| Comparative Example 1 | 697 | 59.1 | 51.4 | 0.39 | 0.28 | 100 | 62 | 10 |
| Comparative Example 2 | 550 | 30.5 | 77.9 | 0.32 | 0.32 | 79 | 94 | 30 |
| Comparative Example 3 | 595 | 30.2 | 78.1 | 0.31 | 0.33 | 86 | 94 | 35 |

As shown in Table 2, the adhesive sheet according to the present invention exhibited good peel strength and reworkability with respect to an adherend and good residue characteristics with respect to the adherend upon removal of the adhesive sheet from the adherend after the adhesive sheet was attached thereto. In addition, the adhesive composition according to the present invention could realize the adhesive sheet and exhibited good storage stability.

Conversely, the adhesive composition prepared without the thermosetting crosslinking agent in Comparative Example 1, the adhesive composition prepared using an excess of the thermosetting crosslinking agent in Comparative Example 2, and the adhesive composition prepared using a hydroxyl group-containing (meth)acrylic copolymer containing a carboxyl group-containing (meth)acrylate in Comparative Example 3 failed to secure the effects of the present invention.

It should be understood that various modifications, changes, alterations, and equivalent embodiments can be made by those skilled in the art without departing from the spirit and scope of the present invention.

The invention claimed is:

1. An adhesive sheet comprising: an adhesive layer formed of an adhesive composition comprising a hydroxyl group-containing (meth)acrylic copolymer, a photoinitiator, a photocurable crosslinking agent, and a thermosetting crosslinking agent,
    wherein the thermosetting crosslinking agent comprises an isocyanate group-containing crosslinking agent and a carboxyl group-containing (meth)acrylate,
    wherein the thermosetting crosslinking agent is present in an amount of about 0.001 parts by weight to less than about 2 parts by weight relative to 100 parts by weight of all of the hydroxyl group-containing (meth)acrylic copolymer and the photocurable crosslinking agent, and
    the adhesive layer has a peel strength of about 600 gf/in or more with respect to a glass plate at 25° C. and a surface energy of about 70 mN/m or more at 25° C.

2. The adhesive sheet according to claim 1, wherein the adhesive sheet has a surface energy variation rate of about 90% or less, as calculated by Equation 1:

$$\text{Surface energy variation rate} = |SE2 - SE1|/SE1 \times 100, \quad [\text{Equation 1}]$$

where SE1 is a surface energy of a glass plate at 25° C. (unit: mN/m) and SE2 is a surface energy of the glass plate at 25° C. (unit: mN/m), as measured after the adhesive sheet bonded to the glass plate via the adhesive layer is left at 25° C. for 2 hours and removed from the glass plate.

3. The adhesive sheet according to claim 1, wherein the hydroxyl group-containing (meth)acrylic copolymer comprises a non-carboxylic acid-based copolymer free from a carboxyl group.

4. The adhesive sheet according to claim 1, wherein the hydroxyl group-containing (meth)acrylic copolymer comprises a copolymer of a monomer mixture comprising a hydroxyl group-containing (meth)acrylic monomer and an alkyl group-containing (meth)acrylic monomer.

5. The adhesive sheet according to claim 4, wherein the hydroxyl group-containing (meth)acrylic monomer is present in an amount of about 5 wt % to about 20 wt % in the monomer mixture.

6. The adhesive sheet according to claim 1, wherein the photocurable crosslinking agent comprises a bifunctional to hexafunctional (meth)acrylate.

7. The adhesive sheet according to claim 1, wherein the photocurable crosslinking agent is present in an amount of about 0.1 parts by weight to about 20 parts by weight relative to 100 parts by weight of all of the hydroxyl group-containing (meth)acrylic copolymer and the photocurable crosslinking agent.

8. The adhesive sheet according to claim 1, wherein the isocyanate group-containing crosslinking agent comprises a polyhydric alcohol-modified isocyanate group-containing crosslinking agent.

9. The adhesive sheet according to claim 1, wherein the carboxyl group-containing (meth) comprises a carboxyl alkyl (meth)acrylate.

10. The adhesive sheet according to claim 1, wherein a weight ratio of the carboxyl group-containing (meth)acrylate to the isocyanate group-containing crosslinking agent ranges from about 1:1 to about 1:5.

11. The adhesive sheet according to claim 1, wherein the thermosetting crosslinking agent is present in an amount of about 0.1 parts by weight to less than about 2 parts by weight relative to 100 parts by weight of all of the hydroxyl group-containing (meth)acrylic copolymer and the photocurable crosslinking agent.

12. The adhesive sheet according to claim 1, further comprising:
 a base film stacked on one surface of the adhesive layer, the base film having a light transmittance of about 90% or more at a wavelength of 200 nm to 400 nm.

13. The adhesive sheet according to claim 1, wherein the adhesive layer further comprises an antistatic agent comprising metal nanowires.

14. An optical member comprising: an adherend for optical displays and an adhesive sheet formed on at least one surface of the adherend, the adhesive sheet being the adhesive sheet according to claim 1.

15. An optical display device comprising the adhesive sheet according to claim 1.

16. An adhesive composition comprising: a hydroxyl group-containing (meth)acrylic copolymer, a photoinitiator, a photocurable crosslinking agent, and a thermosetting crosslinking agent,
 wherein the thermosetting crosslinking agent comprises an isocyanate group-containing crosslinking agent and a carboxyl group-containing (meth)acrylate, and is present in an amount of about 0.001 parts by weight to less than about 2 parts by weight relative to 100 parts by weight of all of the hydroxyl group-containing (meth)acrylic copolymer and the photocurable crosslinking agent.

17. The adhesive composition according to claim 16, comprising: about 80 parts by weight to about 99.9 parts by weight of the hydroxyl group-containing (meth)acrylic copolymer; about 0.1 parts by weight to about 20 parts by weight of the photocurable crosslinking agent; about 0.001 parts by weight to about 5 parts by weight of the photoinitiator relative to 100 parts by weight of all of the hydroxyl group-containing (meth)acrylic copolymer and the photocurable crosslinking agent, and about 0.001 parts by weight to less than about 2 parts by weight of the thermosetting crosslinking agent relative to 100 parts by weight of all of the hydroxyl group-containing (meth)acrylic copolymer and the photocurable crosslinking agent.

18. The adhesive composition according to claim 16, wherein a weight ratio of the carboxyl group-containing (meth)acrylate to the isocyanate group-containing crosslinking agent ranges from about 1:1 to about 1:5.

19. The adhesive composition according to claim 16, wherein the adhesive composition has a viscosity variation rate of about 15% or less, as calculated by Equation 2:

Viscosity variation rate=$|V2-V1|/V1\times 100$, where V1 is a viscosity (unit: cP) of 1 g of the adhesive composition at 25° C. and V2 is a viscosity (unit: cP) of 1 g of the adhesive composition after the adhesive composition is left at 25° C. for 3 days.

* * * * *